(12) United States Patent
Ricknäs et al.

(10) Patent No.: US 11,023,040 B2
(45) Date of Patent: Jun. 1, 2021

(54) SYSTEMS AND METHODS FOR INTERACTING WITH A COMPUTING DEVICE USING GAZE INFORMATION

(71) Applicant: Tobii AB, Danderyd (SE)

(72) Inventors: Daniel Ricknäs, Danderyd (SE); Erland George-Svahn, Danderyd (SE); Rebecka Lannsjö, Danderyd (SE); Andrew Ratcliff, Danderyd (SE); Regimantas Vegele, Danderyd (SE); Geoffrey Cooper, Danderyd (SE); Niklas Blomqvist, Danderyd (SE)

(73) Assignee: Tobii AB, Danderyd (SE)

( * ) Notice: Subject to any disclaimer, the term of this patent is extended or adjusted under 35 U.S.C. 154(b) by 61 days.

(21) Appl. No.: 16/135,449

(22) Filed: Sep. 19, 2018

(65) Prior Publication Data

US 2019/0087000 A1     Mar. 21, 2019

Related U.S. Application Data

(60) Provisional application No. 62/561,585, filed on Sep. 21, 2017.

(51) Int. Cl.
*G06F 3/01* (2006.01)
*G02B 27/01* (2006.01)
*G06F 3/0481* (2013.01)

(52) U.S. Cl.
CPC .......... *G06F 3/013* (2013.01); *G02B 27/017* (2013.01); *G06F 3/017* (2013.01); *G06F 3/0481* (2013.01)

(58) Field of Classification Search
CPC .......... G06F 3/013; G06F 3/011; G06F 3/017; G06F 2203/0381; G06F 3/04842; G06F 3/012; G06F 3/048; G02B 27/0172; G02B 27/017; G06T 1/00; G06T 13/40; H04N 21/2343
See application file for complete search history.

(56) References Cited

U.S. PATENT DOCUMENTS

| 6,204,828 | B1 | 3/2001 | Amir et al. |
| 7,113,170 | B2 | 9/2006 | Lauper et al. |
| 9,619,020 | B2 | 4/2017 | George-Svahn et al. |
| 2008/0088698 | A1 | 4/2008 | Patel et al. |

(Continued)

OTHER PUBLICATIONS

Non-Final Office Action dated Feb. 20, 2020 in related U.S. Appl. No. 16/135,386, all pgs.

*Primary Examiner* — Allahyar Kasraian
(74) *Attorney, Agent, or Firm* — Samuel Yamron

(57) ABSTRACT

Techniques for interacting with a first computing device based on gaze information are described. In an example, the first computing device captures a gaze direction of a first user of the first computing device by using an eye tracking device. The first computing device determines if the gaze direction of the first user is directed to a first display. Further, the first computing device receives information regarding if a gaze direction of a second user is directed to a second display. If the gaze direction of the first user is directed to the first display and the gaze direction of the second user is directed to the second display, the first computing device continuously updates content on the first display. If the gaze direction of the second user is not directed to the second display, the first computing device pauses the content on the first display.

18 Claims, 8 Drawing Sheets

(56) References Cited

U.S. PATENT DOCUMENTS

| | | |
|---|---|---|
| 2013/0169560 A1 | 7/2013 | Cederlund et al. |
| 2014/0347262 A1* | 11/2014 | Paek ........................ G09G 3/20 |
| | | 345/156 |
| 2015/0058450 A1* | 2/2015 | Hahm ................. H04L 65/4084 |
| | | 709/219 |
| 2016/0007047 A1* | 1/2016 | Hosseini ................ H04N 7/147 |
| | | 348/14.13 |
| 2017/0090562 A1* | 3/2017 | Gustafsson ........ G06K 9/00604 |
| 2018/0001198 A1* | 1/2018 | Frappiea ................. A63F 13/49 |
| 2018/0083978 A1* | 3/2018 | Pantazelos .............. G06F 21/10 |
| 2019/0086999 A1 | 3/2019 | Ricknas et al. |
| 2019/0087000 A1 | 3/2019 | Ricknas et al. |

* cited by examiner

SYSTEMS AND METHODS FOR INTERACTING WITH A COMPUTING DEVICE USING GAZE INFORMATION

CROSS-REFERENCE TO RELATED APPLICATION

The present application claims priority to Provisional Application No. 62/561,585, entitled "SYSTEMS AND METHODS FOR INTERACTION WITH A COMPUTING DEVICE USING GAZE INFORMATION," filed Sep. 21, 2017, which is assigned to the assignee hereof and expressly incorporated by reference herein in its entirety.

TECHNICAL FIELD

The present disclosure generally relates to systems and methods for interacting with a computing device and in particular, to systems and methods for interacting with a computing devices using gaze information.

BACKGROUND

Interaction with computing devices is a fundamental action in today's world. Computing devices from personal computers, to mobile devices, to wearable headsets, to smart watches are found throughout daily life. The systems and methods for interacting with such devices defines how they are used, and what they are used for.

Traditionally computing devices have been interacted with using "contact" based interaction techniques. For example the computer mouse, keyboard, and touch screen can all be considered contact based input techniques as they require a user to physically contact something to interact with the computing device.

Recently, advances in eye tracking technology have made it possible to interact with a computing device using a person's gaze information. In other words, the location on a display the user is gazing at. This information can be used for interaction solely, or in combination with a contact based interaction technique.

Previously proposed interaction techniques using gaze information can be found in U.S. Pat. No. 6,204,828, United States Patent Application 20130169560, U.S. Pat. No. 7,113,170, United States Patent Application 20140247232, and U.S. Pat. No. 9,619,020. The full specification of these patents and applications are herein incorporated by reference.

Gaze based interaction techniques offer advantages over traditional contact only interaction techniques, as a person's gaze is faster than moving a physical limb, and intent can easily be communicated using gaze by merely looking at something.

The present disclosure seeks to provide new and improved systems and methods for interacting with a computing device using gaze information.

SUMMARY

Thus, an object of the present disclosure is to provide improved systems and methods for interacting with a computing device using gaze information. This and other objects of the present disclosure will be made apparent from the specification and claims together with appended drawings.

According the present disclosure, there is provided a system and method for interacting with a computing device using gaze information. Wherein the system contains a display, an eye tracker, and a processor for altering or otherwise controlling the contents of the display.

An eye tracker is a device which is able to approximate a user's gaze location on a display. Any form of eye tracker will suffice for the present disclosure, however the common form of an eye tracker is an infrared, image based system. In such a system, infrared illumination is directed toward a user's eye or eyes, images are then captured of the eye or eyes and based on the user's pupil and reflection of the infrared illumination, the eye tracker (or a computing device connected to the eye tracker) may approximate a user's gaze direction. The form of an eye tracker is not the subject of the present disclosure.

BRIEF DESCRIPTION OF THE DRAWINGS

A further understanding of the nature and advantages of various embodiments may be realized by reference to the following figures.

DETAILED DESCRIPTION

Remote Sharing

Figure 1:
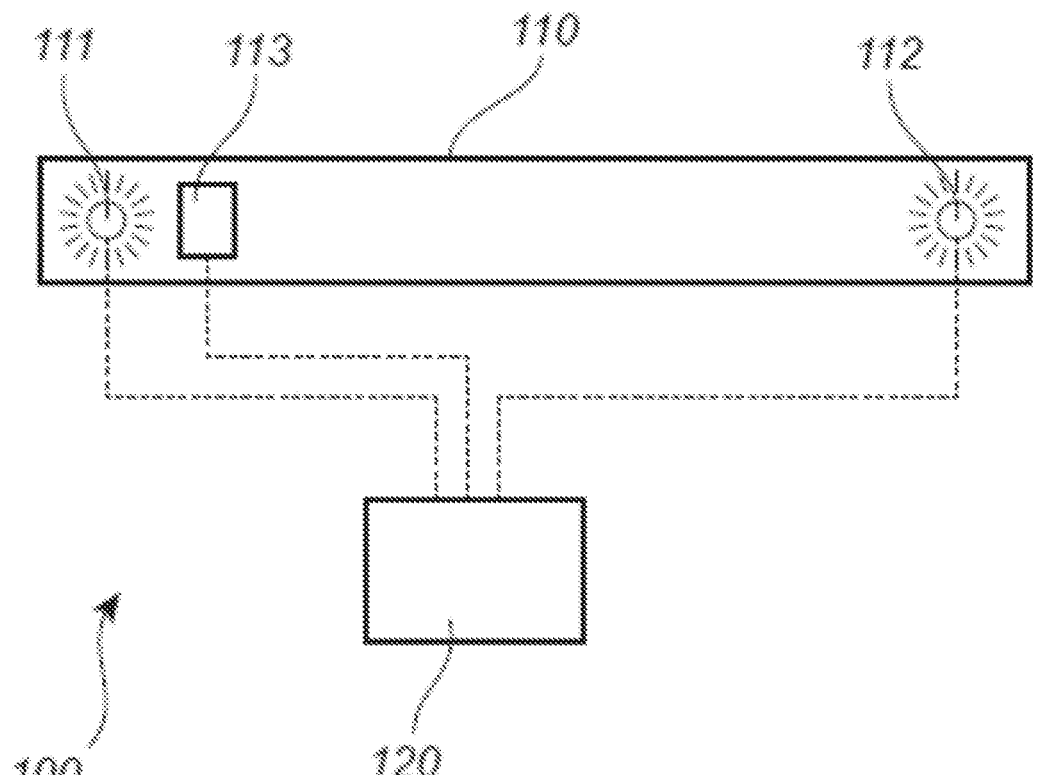
FIG. 1 illustrates an eye tracking system, according to an embodiment of the present disclosure.

According to a first aspect of the present disclosure, a method for sharing information is provided wherein two or more users are using separate computing devices. Each computing device is equipped with an eye tracker according to the present disclosure.

A location is provided on each user's display where when the users are both gazing at the same spot, information can be shared. This is achieved using a method approximating the following, where User 1 is interacting with Computer 1, and User 2 is interacting with Computer 2:

1. Computer 1 displays a designated sharing location on its display.
2. Computer 2 displays a designated sharing location on its display.
3. User 1 gazes at the designated sharing location on Computer 1.

4. User 1 attempts to share information by moving the information to the designated sharing location (or another predetermined location). This sharing of information may take place using a traditional "drag and drop" movement whereby information such as a file, or document, is moved using a contact input method across a display and "dropped" by releasing the contact input method at the desired location.
5. If User 2 is gazing at the designated sharing location on Computer 2, the information is transmitted from Computer 1 to Computer 2.
6. If User 2 is not gazing at the designated sharing location on Computer 2, the information is not transmitted from Computer 1 to Computer 2.

The designated sharing location may be the same on both computing devices, or it may be different. It may be indicated by a graphical marker, or it may be an invisible location. Additionally, any number of computing devices and user's may interact using this aspect of the present disclosure.

In a further improvement, it is sufficient only that User 2 gazes at the designated sharing location in order to accept transmission of the information. It is further sufficient that User 1 gaze at the designated sharing location, and is able to look away during transmission of the information.

Presence Window

According to a second aspect of the present disclosure, there is provided a location on a display that alters based on whether a user, or users, is present in front of a computing device.

The presence of the user is preferably determined by an eye tracker.

When a first user is determined to be present in front of a first computing device, and concurrently a second user is determined to be present in front of a second computing device, information displayed on the display may be altered. For example a specific window or area may appear on the display, or the properties of an existing item (such as brightness or color) on the display may change. Further, or alternatively, an audible or other feedback may sound. This window may be used for text or video based chatting, sending and receiving files, sharing information or anything else possible on the computing device.

Head Position Camera

According to a third aspect of the present disclosure, there is provided a system and method for a first user to control the camera of a computing device being used by a second user.

According to this aspect, the first user moves his or her head in order to control the camera of a computing device used by a second user.

By way of example, consider a scenario where two users are conducting a video call. The first user on the first computing device moves his or her head, and the image transmitted by the second computing device of the second user is altered. For example, the first user may tilt their head to the right, causing the perspective of the image transmitted from the second computing device to move to the left, and vice-versa.

In a further improvement, the altering of the image may be based on gaze direction rather than head orientation.

The altering of the image transmitted may be achieved by either physical manipulation of the camera, or by processing of the image captured by the camera, as would be readily understood by a person of skill in the art.

Eye Activated Dialogue

According to a fourth aspect of the present disclosure, as further described in connection with FIGS. 4-6, there is provided a system and method for a first user of a first computing device to communicate with a second user of a second computing device using gaze as a trigger to the communication.

According to this aspect of the present disclosure, representations of users are displayed on a display. Each representation representing a user using a computing device. Preferably these users are remote from one another.

A first user, using a first computing device having representations of at least one other user on the display, may gaze at the representation of a user. An eye tracker, or the computing device, may determine that the first user is gazing towards the representation of the second user. The first user may then direct an interaction toward the second user by gazing at the second user's representation.

In a further improvement, the second user may be alerted to the fact the first user is gazing at their representation by some form of visual, or audible, notification By way of example, the first user may gaze at the representation of the second user and speak words. These spoken words are transmitted to the second user's computing device and emitted by a speaker connected to the second user's computing device. Alternatively to spoken words, text communication, file transmittal, or any other form of interaction could be used.

This communication may be initiated simply by the first user gazing at the second user's representation, or alternatively it may only be initiated if both users are gazing at their counterparts respective representations on their computing devices.

Further, the first user may have access to a pointing device. In one example, the pointing device is used to move a file or a document on the display to the representation of the second user by means of the pointing device. In another example, the words are transmitted to the second user's computing device only if, additionally, an action is triggered by the pointing device during the time period when the gaze direction of the first user is directed to the representation of the second user. The pointing device may be a mouse, a pointer, a joystick or similar. The action triggered by the pointing device may relate to pressing a button, performing a specific movement or similar.

Any form of communication may take place, from verbal, to text, to video, to transmittal of files.

Responsive Portraits

According to a fifth aspect of the present disclosure, there is provided a system and method for a representation of a user displayed on a display to respond to another user's gaze being directed to the representation.

In this aspect of the present disclosure, a representation of a second user is displayed on the display of a first user's computing device. When the first user gazes toward this representation, the representation alters in response.

In a further improvement, the a representation of the first user may be displayed on the display of the second user's computing device, and when both users are gazing towards the representation of the other user on their computing device, the representations may further alter.

Any reference to representations or the like in this specification are intended to include any form of graphical representation conceivable, including but not limited to, a photographic representation, an animated representation, a cartoon-like representation, a line-drawing representation, a shadow-like representation, or any alternative representation (for example an animal or other character).

Only one user requires a computing device equipped with an eye tracker for this aspect of the present disclosure.

Watch Together

According to a sixth aspect of the present disclosure, as further described in connection with FIGS. 7-9, there is provided a system and method for multiple users to view content simultaneously on remote devices.

According to this aspect of the present disclosure, a first user of a first computing device shares content (such as video, a shared virtual space, audio, video game graphics, text, multimedia pages or the like) with a second user of a second computing device. Both computing devices are equipped with an eye tracker, and thus are capable of tracking a user's gaze relative to a display of the computing device.

The two computing devices synchronize that both users are viewing the same piece of content, based on their gaze activity relative to the display.

In a further improvement, the content may be created collaboratively by the users, for example a shared drawing. In this way each user may create the drawing, as would be understood by a person of skill in the art any manner of traditional computer based drawing methods may be used, and the user's gaze information can be used by the other users during the collaborative drawing process.

Highlight Reel

According to a seventh aspect of the present disclosure, there is provided a system and method for determining a user's reaction to content at the time the user viewed the content.

According to this aspect of the present disclosure, when a user is viewing content such as a video, on a computing device equipped with an eye tracker, the computing device registers the user's reaction to specific portions of the content and records that reaction.

A user's reaction may be based on gaze, or it may be based on facial features.

The computing device may analyze the user's reaction to determine if the reaction is positive, negative, neutral or the like. Various degrees of reaction would be obvious to a person of skill in the art.

These reactions may be compiled and added to the content, for example in the case of a video, graphical representations of a user's reaction (such as a smiling face for a positive reaction) may be added below the video at the time in the video the user reacted. These representations could appear anywhere in the video, or separately to the video. For example graphical representations of a user's reaction could appear at the gaze position of the user on the video, or at an averaged gaze location of the user over a predetermined period of time.

Instead of a graphical representation, a user's reaction may simply be displayed as the actual image, images, or video, recorded by the eye tracker.

User reactions may further be compiled into their own video.

Face to Avatar

According to an eight aspect of the present disclosure, there is provided a system and method for translating a user's facial expressions to a graphical representation of the user.

According to this aspect of the present disclosure, a graphical representation of a user such as an avatar is altered based on images captured by an eye tracker. These images may contain items such as facial expressions, and gaze movements.

The graphical representation may alter to match these facial expressions and or gaze movements exactly, or in an exaggerated fashion.

The graphical representations may be in any form, including but not limited to, a photographic representation, an animated representation, a cartoon-like representation, a line-drawing representation, a shadow-like representation, or any alternative representation (for example an animal or other character).

In a further improvement, the avatar may react to a user's gaze. For example when a user gazes at the avatar's position on the display, the avatar looks directly back at the user. Further, for example, if the user gazes to the side of the avatar, the avatar also gazes to the side.

In a further improvement, the avatar may be seen to be performing its own tasks on the display, or no tasks at all, until it is gazed at. For example the avatar may be animated such that it appears to be moving, and then reacts to the user's gaze when the user's gaze is on or near the graphical representation.

Collaborative Presence

According to a ninth aspect of the present disclosure there is provided a system and method for multiple users using different computing devices to view one another's gaze point relative to the same content.

According to this aspect, a first user on a first computing device with an eye tracker views content, and a second user on a second computing device with an eye tracker views the same content. The eye tracker of each computing device determines the user's gaze direction, and the computing device transmits that direction to the other computing device. The other computing device then displays the gaze direction on its display.

In this way, a first user may see where a second user is gazing in relation to the same content the first user is gazing at.

This is particularly beneficial in a collaborative environment where multiple users are viewing or altering the same content.

Microphone Control

In a tenth aspect of the present disclosure there is provided a system and method for controlling a microphone or sound recording device of a computing device based on a user's gaze.

According to this aspect, when a user gazes towards or near a predetermined area, the microphone or sound recording device of the computing device is enabled.

The predetermined area may be on a display (for example an icon or other graphic item), or off a display (for example a keyboard, or logo of the computer device maker).

In a further improvement, the microphone or sound recording device may only be enabled when it is determined that a user is present in front of the computing device, in this improvement the user's gaze direction need not be used. This determination of presence may be performed based on a user's gaze direction, a user's facial features, a user's head location or orientation, or any other analysis of an image captured by a camera connected to the computing device.

According to this aspect, a microphone or other sound recording device may only be enabled and able to capture audio when a user desires it to be so, or at least only enabled when a user is actually present by the computing device. When the microphone or sound recording device is enabled, it may be continuously recording or transmitting audio, or it may intermittently record or transmit audio.

Eye Tracking

FIG. 1 shows an eye tacking system 100 (which may also be referred to as a gaze tracking system), according to an embodiment. The system 100 comprises illuminators 111 and 112 for illuminating the eyes of a user, and a light sensor 113 for capturing images of the eyes of the user. The illuminators 111 and 112 may for example be light emitting diodes emitting light in the infrared frequency band, or in the near infrared frequency band. The light sensor 113 may for example be a camera, such as a complementary metal oxide semiconductor (CMOS) camera or a charged coupled device (CCD) camera.

A first illuminator 111 is arranged coaxially with (or close to) the light sensor 113 so that the light sensor 113 may capture bright pupil images of the user's eyes. Due to the coaxial arrangement of the first illuminator 111 and the light sensor 113, light reflected from the retina of an eye returns back out through the pupil towards the light sensor 113, so that the pupil appears brighter than the iris surrounding it in images where the first illuminator 111 illuminates the eye. A second illuminator 112 is arranged non-coaxially with (or further away from) the light sensor 113 for capturing dark pupil images. Due to the non-coaxial arrangement of the second illuminator 112 and the light sensor 113, light reflected from the retina of an eye does not reach the light sensor 113 and the pupil appears darker than the iris surrounding it in images where the second illuminator 112 illuminates the eye. The illuminators 111 and 112 may for example take turns to illuminate the eye, so that every second image is a bright pupil image, and every second image is a dark pupil image. The eye tracking system 100 also comprises circuitry 120 (for example including one or more processors) for processing the images captured by the light sensor 113. The circuitry 120 may for example be connected to the light sensor 113 and the illuminators 111 and 112 via a wired or a wireless connection. In another example, circuitry 120 in the form of one or more processors may be provided in one or more stacked layers below the light sensitive surface of the light sensor 113.

Figure 2:
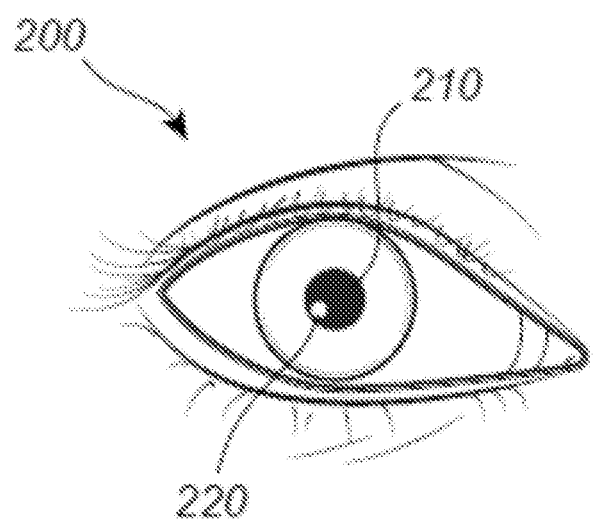
FIG. 2 illustrates an example of an image of an eye capture by an image sensor, according to an embodiment of the present disclosure.

FIG. 2 shows an example of an image of an eye 200, captured by the light sensor 113. The circuitry 120 may for example employ image processing (such as digital image processing) for extracting features in the image. The circuitry 120 may for example employ pupil center cornea reflection (PCCR) eye tracking to determine where the eye 200 is looking. In PCCR eye tracking, the processor 120 estimates the position of the center of the pupil 210 and the position of the center of a glint 220 at the eye 200. The glint 220 is caused by reflection of light from one of the illuminators 111 and 112. The processor 120 calculates where the user is in space using the glint 220 and where the user's eye 200 is pointing using the pupil 210. Since there is typically an offset between the optical center of the eye 200 and the fovea, the processor 120 performs calibration of the fovea offset to be able to determine where the user is looking. The gaze directions obtained from the left eye and from the right eye may then be combined to form a combined estimated gaze direction (or viewing direction). As will be described below, many different factors may affect how the gaze directions for the left and right eyes should be weighted relative to each other when forming this combination.

In the embodiment described with reference to FIG. 1, the illuminators 111 and 112 are arranged in an eye tracking module 110 placed below a display watched by the user. This arrangement serves only as an example. It will be appreciated that more or less any number of illuminators and light sensors may be employed for eye tracking, and that such illuminators and light sensors may be distributed in many different ways relative to displays watched by the user. It will be appreciated that the eye tracking scheme described in the present disclosure may for example be employed for remote eye tracking (for example in a personal computer, a smart phone, or integrated in a vehicle) or for wearable eye tracking (such as in virtual reality glasses or augmented reality glasses).

Miscellaneous

The person skilled in the art realizes that the present disclosure is by no means limited to the preferred embodiments described above. On the contrary, many modifications and variations are possible within the scope of the appended claims. For example, the person skilled in the art realizes that the eye/gaze tracking methods described herein may be performed by many other eye/gaze tracking systems than the example eye/gaze tracking system 100 shown in FIG. 1, for example using multiple illuminators and multiple cameras.

Additionally, variations to the disclosed embodiments can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. The mere fact that certain measures/features are recited in mutually different dependent claims does not indicate that a combination of these measures/features cannot be used to advantage. Method steps need not necessarily be performed in the order in which they appear in the claims or in the embodiments described herein, unless it is explicitly described that a certain order is required. Any reference signs in the claims should not be construed as limiting the scope.

Specialized Computer System

Figure 3:
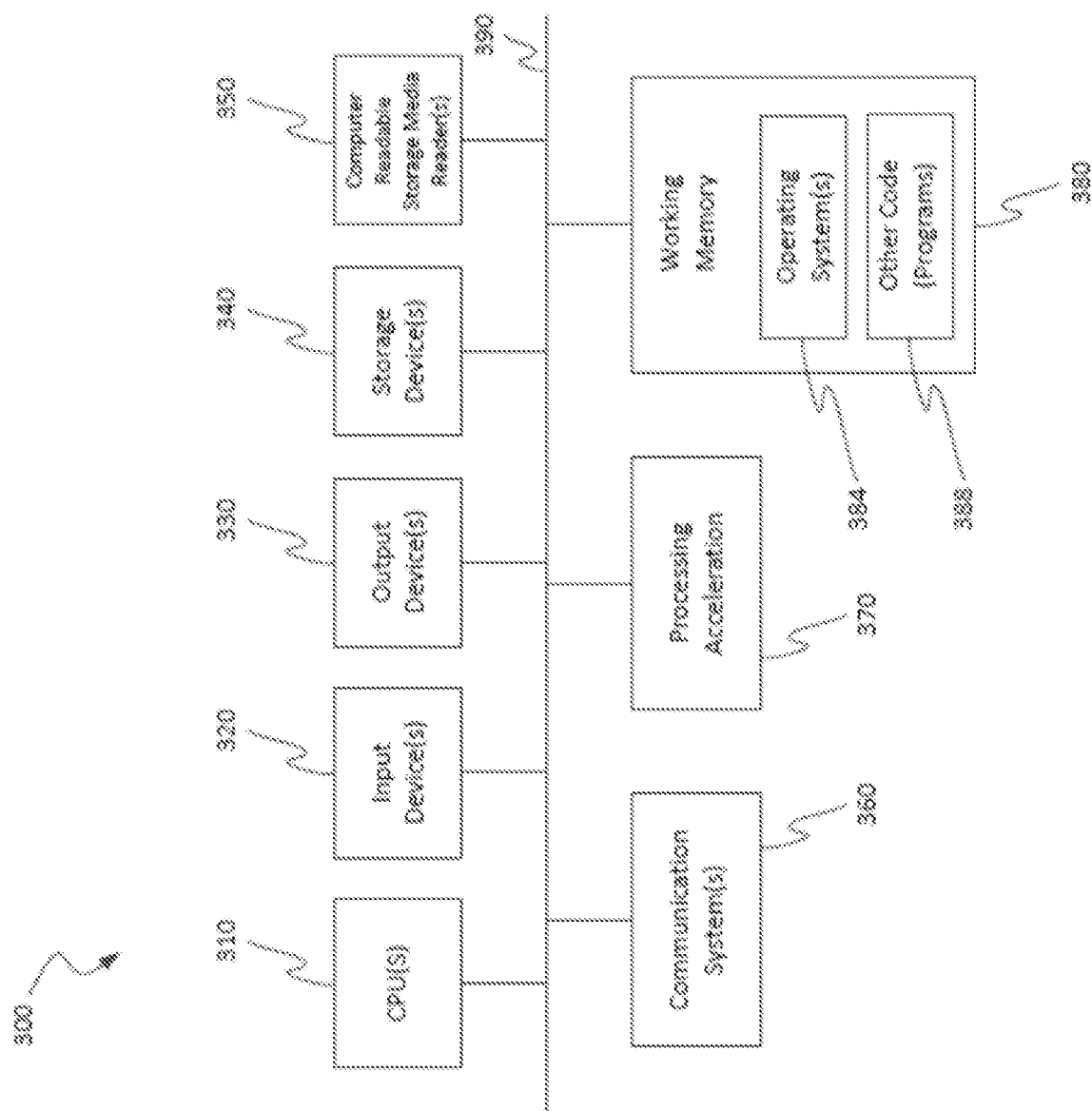
FIG. 3 illustrates a block diagram of a specialized computer system, according an embodiment of the present disclosure.

FIG. 3 is a block diagram illustrating a specialized computer system 300 in which embodiments of the present disclosure may be implemented. This example illustrates specialized computer system 300 such as may be used, in whole, in part, or with various modifications, to provide the functions of components described herein.

Specialized computer system 300 is shown comprising hardware elements that may be electrically coupled via a bus 390. The hardware elements may include one or more central processing units 310, one or more input devices 320 (e.g., a mouse, a keyboard, eye tracking device, etc.), and one or more output devices 330 (e.g., a display device, a printer, etc.). Specialized computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

Specialized computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, specialized computer system 300 may also include a processing acceleration unit 370, which can include a digital signal processor, a special-purpose processor and/or the like.

Computer-readable storage media reader 350 can further be connected to a computer-readable storage medium, together (and, optionally, in combination with storage device(s) 340) comprehensively representing remote, local, fixed, and/or removable storage devices plus storage media for temporarily and/or more permanently containing computer-readable information. Communications system 360 may permit data to be exchanged with a network, system, computer and/or other component described above.

Specialized computer system 300 may also comprise software elements, shown as being currently located within a working memory 380, including an operating system 384 and/or other code 388. It should be appreciated that alternate embodiments of specialized computer system 300 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of specialized computer system 300 may include code 388 for implementing any or all of the function of the various elements of the architecture as described herein. For example, software, stored on and/or executed by a specialized computer system such as specialized computer system 300, can provide the functions of components of the disclosure such as those discussed above. Methods implementable by software on some of these components have been discussed above in more detail.

Throughout this document references have been made to an "eye tracker" or similar. Although the present disclosure has been described with reference to eye or gaze tracking, it is intended that the present disclosure function with any form of image based capture system. For example the "eye tracker" does not necessarily need to determine a user's gaze direction, but could determine just a user's facial features, expressions or even simply whether a user is present in front of a computing device.

Any reference to a "computing device" or similar is intended to include any form of computing, from desktop based personal computing, to wearable devices such as Virtual Reality or Augmented Reality headsets, to portable devices such as mobile phones or tablets.

Any reference to a "display" or similar is intended to include any form of display, such as a head-mounted display, a virtual reality display, an augmented reality display or a combination thereof.

Eye Activated Dialogue

Figure 4:
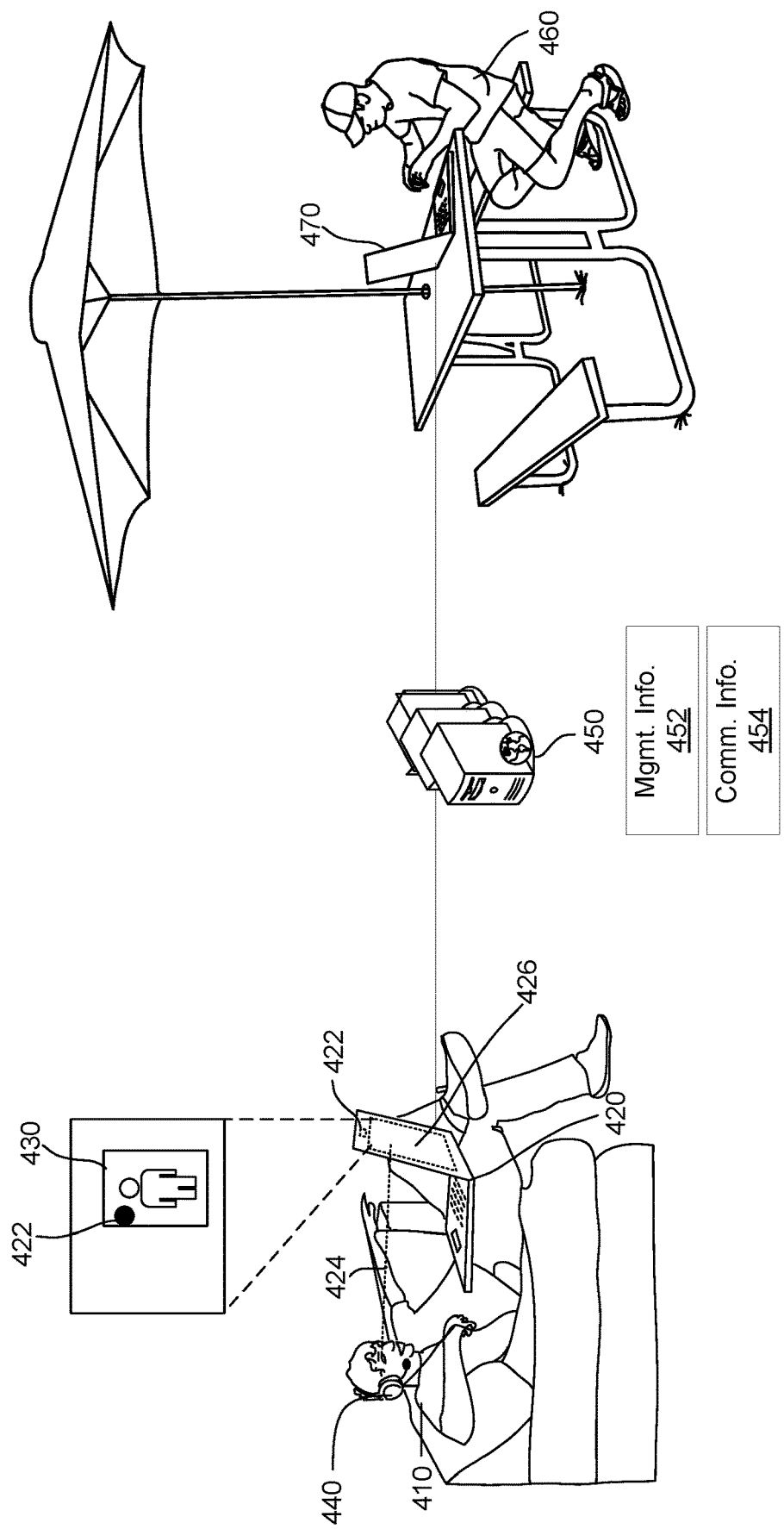
FIG. 4 illustrates a computer system for managing communication based on gaze information, according an embodiment of the present disclosure.
Figure 5:
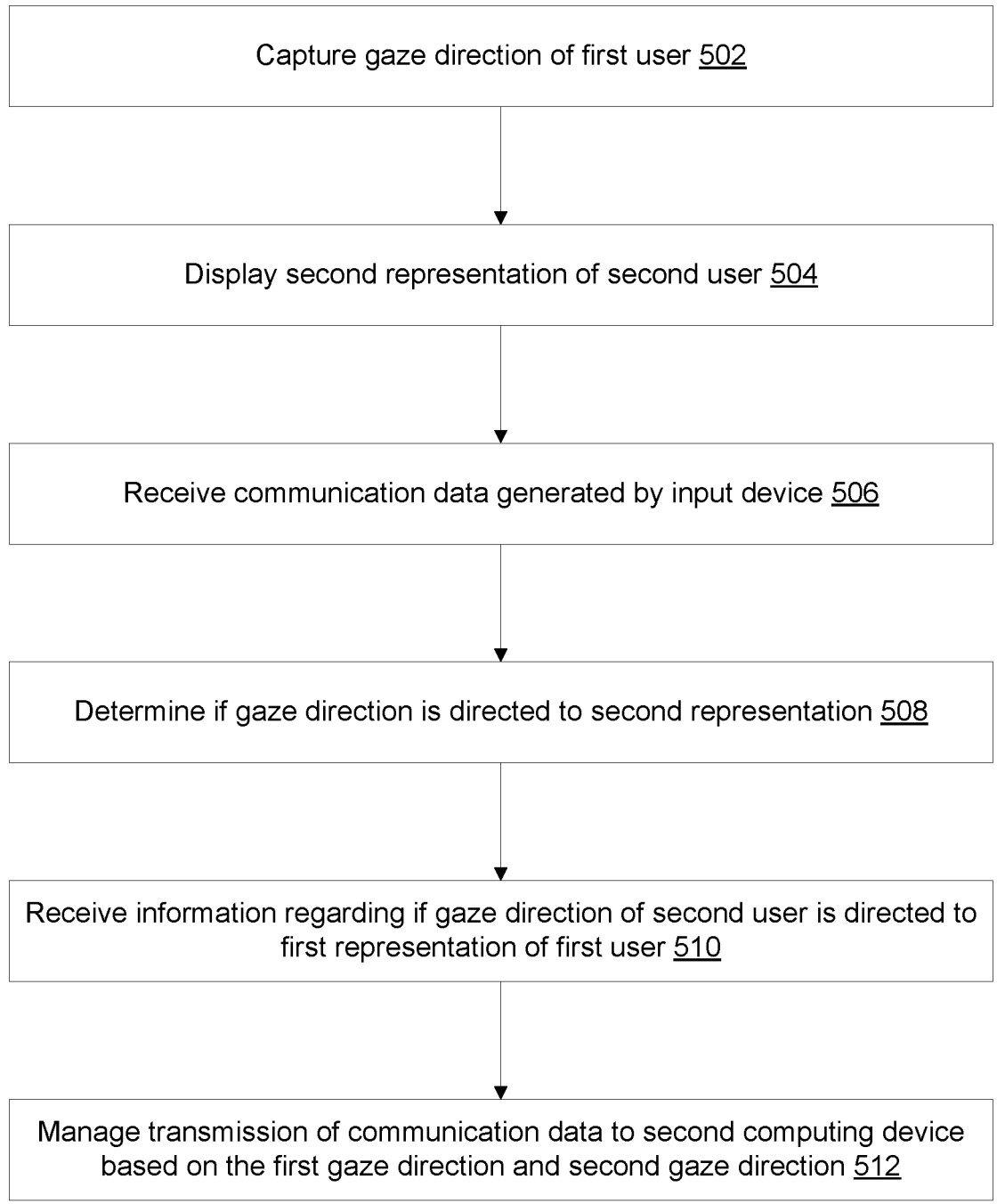
FIG. 5 illustrates a flow implemented by a first computing device to communicate with a second computing device based on gaze information, according an embodiment of the present disclosure.
Figure 6:
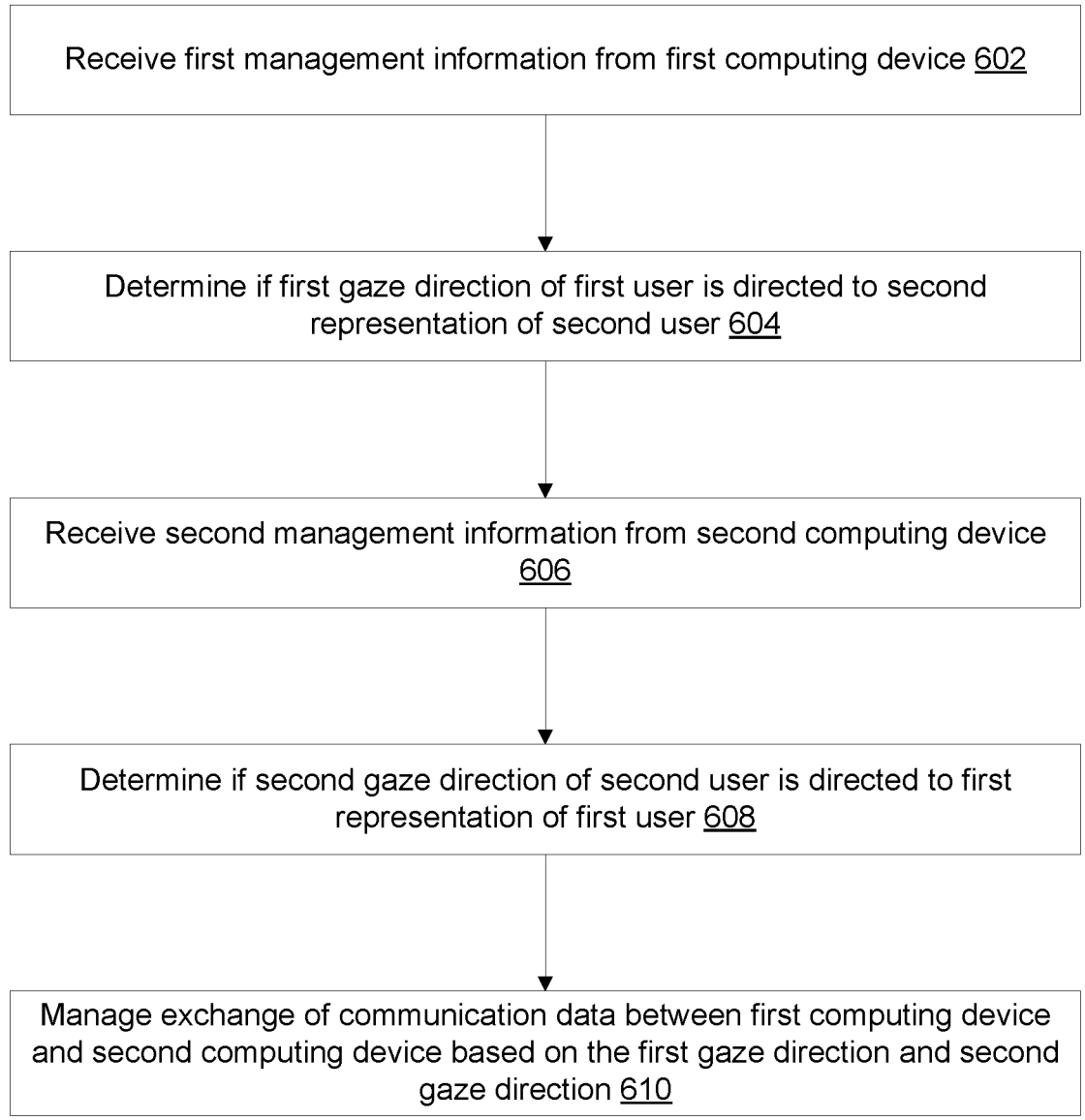
FIG. 6 illustrates a flow for managing communication based on gaze information, according an embodiment of the present disclosure.

FIGS. 4-6 illustrate example embodiments for eye activated dialogues. In an example, users operates computing device to communicate. Gaze information of the users can be used to trigger and manage the communications.

FIG. 4 illustrates a computer system for managing communication based on gaze information, according an embodiment of the present disclosure. As illustrated, the computer system includes a first computing device 420 of a first user 410 and a second computing device 470 of a second user 460. The first computing device 420 and the second computing device 470 are communicatively coupled over a data network (not shown in FIG. 4), such as the Internet or a local area network, to exchange communication information. The exchange of the communication information, including triggers for starting and ending the transmission of the communication information and alerts about the communication may depend on the gaze of the first user 410 and/or the second user 460.

Optionally, the computer system further includes a communication server 450 that manages certain aspects of the communication between the computing devices 420 and 470. The use of the communication server 450 is further described herein below and operations thereof are further illustrated in FIG. 7.

In an example, the first computing device 420 includes a number of computing components, such as a processor, a memory, a display (shown as a display 426 in FIG. 4), input/output (I/O) interfaces, network interfaces, and other computing components for receiving input of the first user 410 and communicating with the second computing device 470. For instance, the first computing device 420 can be a mobile device, tablet, a laptop, a desktop computer, a wearable device (e.g., a virtual reality device, an augmented reality device; in such a case, the display 426 is a head-mounted display) or any other suitable user device. In addition, the first computing device 420 includes (e.g., integrates or interfaces with) an eye tracking device 422 having similar components as the eye tacking system 100 of FIG. 1. The eye tracking device 422 is used to track a gaze 424 of the first user 410 on the display 426 and accordingly generate gaze information. The gaze information includes, among other data, a gaze direction of the gaze 424.

In an example, the first computing device 420 executes a communication application that facilitates the exchange of the communication information with the second computing device 470. The communication application may support the exchange of text data, audio data, image data, video data, files, documents, executable codes or other digital communication data (depending on the input device, as explained herein below).

As part of supporting the communication, the communication application can display a representation 430 of the second user 460 on the display 426 (e.g., in a graphical user interface (GUI) rendered on the display 426). The representation can be a static graphical object representing the second user 460, such as an image or an avatar, or can be a dynamic graphical object such as a live video of the second user 460, where the live video is received as a video stream from the second computing device 470 over the data network. Generally, the communication application presents the representation 430 at particular location on the GUI of the display 426 and maintains the location information (e.g., pixel coordinates) of the representation 430.

The communication application may also interface with the eye tracking device 422 (or an eye tracking application executed by the eye tracking device 422) based on an application programming interface (API). Accordingly, the communication application can receive certain gaze information from the eye tracking device 422 including, for instance, the gaze direction and/or location relative to the display 426 (the gaze location is shown as location 422 on the display 426 in FIG. 4). Based on this information about the gaze 424 of the first user 410 and the location information of the representation 430 of the second user 470 relative to the display 416, the eye tracking device 422 can determine whether the gaze direction of the first user 410 is directed to the representation 430 of the second user 470 or not (or, similarly, whether the gaze location 422 is within or proximate to the representation 430). Alternatively, the communication application can send the location information of the representation 430 to the eye tracking device 422, which can respond with the determination. This determination can be used to trigger the start and end of the communication as well as alerting the second user 470. Herein next, the use of the gaze direction is described. Whether the gaze location 422 is within or proximate to the representation 430 can be similarly used (e.g., the communication starts if the gaze location 422 is within or proximate to the representation 43).

In an example, the communication starts if the gaze direction of the first user 410 is directed to the representation 430 of the second user 470. Once started, the communication ends if the gaze direction of the first user 410 is no longer directed to the representation 430 of the second user 470.

In addition, upon determining that the gaze direction of the first user 410 is directed to the representation 430, the communication application can send an alert to the second computing device 470 about this determination. In turn, the second computing device 470 may present a graphical and/or audible alert (e.g., via a communication application executing thereat) about the first user's 410 gaze to the second user 460. Similarly, upon determining that the gaze direction of the first user 410 is no longer directed to the representation 430, the communication application can send an update to the second computing device 470 about this determination. In turn, the second computing device 470 may present a graphical and/or audible alert (e.g., via a communication application executing thereat) about the change to the first user's 410 gaze to the second user 460.

Furthermore, the above triggers and/or alerts about the communication may also be conditioned on the gaze of the second user 470 (e.g., the second user's 470 gaze direction or, similarly, gaze location). In particular, the second computing device 470 can include similar computing components as the ones of the first computing device 420, including an eye tracking device and a communication application. Accordingly, the second computing device 420 can present a representation of the first user 410 on the display of the second computing device 420, track the second user's 460 gaze on this display 420, and determine whether the second user's 460 gaze direction is directed to the representation of the first user 410. Information about this determination (e.g., such as a flag set to "1" to indicate that the second user's 460 gaze direction is directed to the representation of the first user 410 and, otherwise, set to "0") can be transmitted from the second computing device 470 to the first computing device 410. In turn, the first computing device 420 exchanges the communication information with the second computing device 470 only if both users have gaze directions directed to the respective representations of each other.

Further, the first computing device 420 includes (e.g., integrates or interfaces with) an input device 440 such as one or more of a microphone, a keyboard, a camera, a video camera, or a pointing device. The type of communication with the second computing device 470 depends on the type of the input device.

For instance, if the input device 440 is a microphone, the communication includes communication data that is voice data generated by the microphone. If the input device 440 is a keyboard, the communication includes communication data that is text data generated by the keyboard. If the input device 440 is a camera, the communication includes communication data that is an image generated by the camera. If the input device 440 is a video camera, the communication includes communication data that is a video generated by the video camera.

If the input device 440 is a pointing device, the communication includes communication data that is a file or document that has been moved on the display 426 to the representation 430 of the second user 470 by means of the pointing device. In addition, the communication data comprises the position of the pointing device. Further, the first computing device can be configured to transmit the communication data to the second computing device 470 only if, additionally, an action is triggered by the pointing device during the period when the gaze direction of the first user 410 is directed to the representation 430 of the second user 460.

As also illustrated in FIG. 4, the communication server 450 may be used to manage certain aspects of the communication between the first user device 420 and the second user device 470. In particular, the communication server 450 can receive management information 452 and communication information 454 from the computing devices 420 and 470. Generally, the management information 452 is used to manage the exchange of the communication information 454 (including any of the digital communication data described herein above). Different types of management information are possible.

In one example, the management information received from the first computing device 420 includes the determination of whether the first user's 410 gaze direction (or, similarly, gaze location) is directed to the representation 430 of the second user 460. Likewise, the management information received from the second computing device 470 may include the corresponding determination. Based on either one or both determinations (e.g., that one of the users is gazing towards or on the representation of the other user, or both users are gazing on such representations), the communication server 450 may transfer the communication information 454 between the two computing devices 420 and 470.

In another, the management information received from the first computing device 420 includes the gaze information of the first user 410 and the location information of the representation 430 of the second user 460. The communication server 450 may then perform the determination of whether the first user's 410 gaze direction (or, similarly, gaze location) is directed to the representation 430 of the second user 460. Likewise, the management information received from the second computing device 470 may include the corresponding gaze and location information such that the communication server 450 performs a similar determination for the second user 460. Based on either one or both determinations (e.g., that one of the users is gazing towards or on the representation of the other user, or both users are gazing on such representations), the communication server 450 may transfer the communication information 454 between the two computing devices 420 and 470.

In the above embodiments, achieving a directional flow of the communication data is also possible. For example, if a determination is made (e.g., by the first computing device 420 or the communication server 450) that the first user's 410 gaze direction is directed to the representation 430 of the second user 470 and a determination is made (e.g., by the second computing device 470 or the communication server 450) that the second user's 460 gaze is not directed to the representation of the first user 410, communication data may flow from the first computing device 420 to the second computing device 470, but not the other way around.

FIG. 5 illustrates a flow implemented by a first computing device to communicate with a second computing device based on gaze information, according an embodiment of the present disclosure. A first computing device, such as the first computing device 420 of FIG. 4, is described as performing operations of the flow. Instructions for performing the operations can be stored as computer-readable instructions on a non-transitory computer-readable medium of this computing device. As stored, the instructions represent programmable modules that include code or data executable by a processor(s) of the computing device. The execution of such instructions configures the computing device to perform the specific operations shown in FIG. 5 and described herein. Each programmable module in combination with the processor represents a means for performing a respective operation(s). While the operations are illustrated in a particular order, it should be understood that no particular order is necessary and that one or more operations may be omitted, skipped, and/or reordered. Further, for the purpose of brevity, the use of gaze directions is described in connection with the example flow of FIG. 5. Nonetheless, the example flow can be similarly performed by additionally or alternatively using gaze location.

As illustrated, the example flow of FIG. 5 starts at operation 502, where the first computing device captures a gaze direction of a first user of the first computing device. In an example, the gaze direction is captured by using an eye tracking device. In particular, the eye tracking device generates gaze information about the gaze of the first user on a display of the first computing device. The gaze information includes the gaze direction.

At operation 504, the first computing device displays a representation of a second user on the display of the first computing device. In an example, the representation is presented on a GUI of the display and the first computing device tracks a display location of the representation.

At operation 506, the first computing device receives, from the first user, communication data generated by an input device. In an example, the first user operates the input device and provides input thereat. The input can include text, voice, image, video, file selection, file-related operation, or any other user input depending on the type of the input device.

At operation 508, the first computing device determines if the gaze direction of the first user is directed to the representation of the second user. In an example, the first computing device compares the gaze direction to the display location of the representation to make this determination.

At operation 510, the first computing device receives, from the second computing device, information regarding if a gaze direction of the second user is directed to a representation of the first user on a display of the second computing device. In an example, the second computing device may similarly display the representation of the first user, track the second user's gaze, and determine whether the gaze direction of the second user is directed to this representation, generate the information accordingly, and transmit this information to the first computing device over a data network.

At operation 512, the first computing device manages the transmission of communication data to the second computing device based on either one or both gaze directions (e.g., the first gaze direction of the first user as determined under operation 508 and the second gaze direction of the second user as indicated in the information received under operation 510). Different types of management are possible. In one example, the management depends only on the first gaze direction. In this example, the first computing device transmits the communication data to the second computing device, if the gaze direction of the first user is directed to the representation of the second user. In another example, the management further depends on the second gaze direction.

In this example, the first computing device transmits the communication data to the second computing device, only if both the gaze direction of the first user is directed to the representation of the second user and the gaze direction of the second user is directed to the representation of the first user.

FIG. 6 illustrates a flow for managing communication based on gaze information, according an embodiment of the present disclosure. A communication server, such as the communication server 450 of FIG. 4, is described as performing operations of the flow. Instructions for performing the operations can be stored as computer-readable instructions on a non-transitory computer-readable medium of this communication server. As stored, the instructions represent programmable modules that include code or data executable by a processor(s) of the communication server The execution of such instructions configures the communication server to perform the specific operations shown in FIG. 6 and described herein. Each programmable module in combination with the processor represents a means for performing a respective operation(s). While the operations are illustrated in a particular order, it should be understood that no particular order is necessary and that one or more operations may be omitted, skipped, and/or reordered. Further, for the purpose of brevity, the use of gaze directions is described in connection with the example flow of FIG. 6. Nonetheless, the example flow can be similarly performed by additionally or alternatively using gaze location.

As illustrated, the example flow of FIG. 6 starts at operation 602, where the communication server receives first management information from a first computing device. In a first example, the first management information includes information about a determination performed by the first computing device of whether a first gaze direction of a first user of the first computing device is directed to a second representation of a second user, where the second representation is presented on a first display of the first computing device. In a second example, the first management information includes the first gaze direction and display location of the second representation.

At operation 604, the communication server determines if the first gaze direction is directed to the second representation. This determination may depend on the type of the received management information. In the first example above, the communication server may extract the determination of the first computing device from the management information. In the second example above, the communication server may perform this determination by comparing the first gaze direction to the display location.

At operation 606, the communication server receives second management information from the second computing device. This operation is similar to operation 604, except that this management information is generated and sent by the second computing device. In particular, the second management information is generated based on a second gaze direction of the second user and a first representation of the first user, where the first representation is presented at a display of the second computing device.

At operation 608, the communication server determines if the second gaze direction is directed to the first representation. This operation is similar to operation 606, except that the determination is performed based on the second management information.

At operation 610, the communication server manages an exchange of communication data between the first computing device and the second computing device based on the first gaze direction and/or second gaze direction. Different types of communication management are possible. In one example, the management depends only on the first gaze direction. In this example, the communication server receives first communication data from the first computing device and second communication data from the second computing device. The communication server sends the first communication data to the second computing device and the second communication data to the first computing device if the first gaze direction of the first user is directed to the second representation of the second user. In another example, the management further depends on the second gaze direction. In this example, the first computing device transmits the first communication data to the second computing device and the second communication data to the first computing device, only if both the first gaze direction of the first user is directed to the second representation of the second user and the second gaze direction of the second user is directed to the first representation of the first user.

Watch Together

Figure 7:
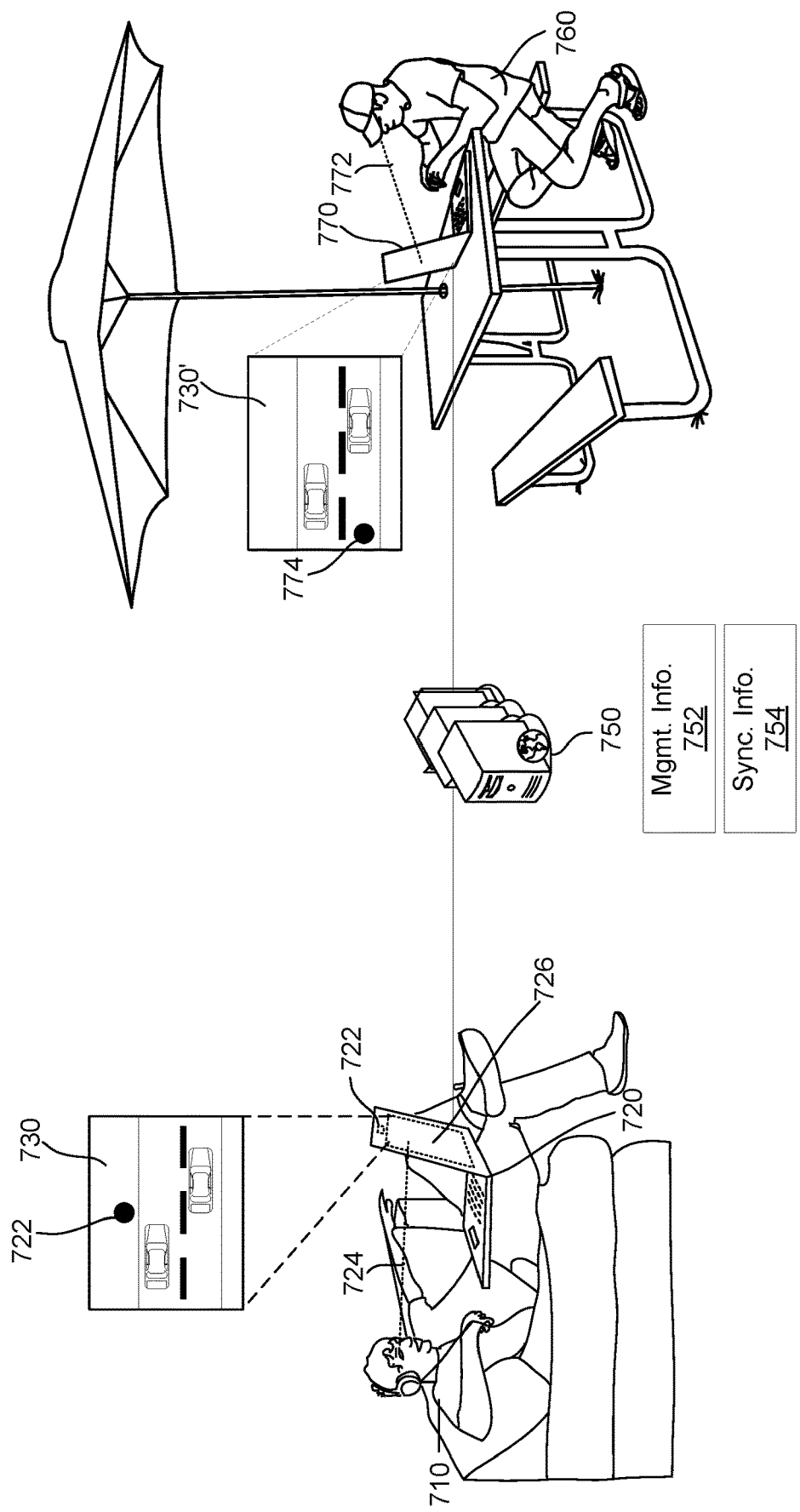
FIG. 7 illustrates a computer system for managing the presentation of content based on gaze information, according an embodiment of the present disclosure.
Figure 8:
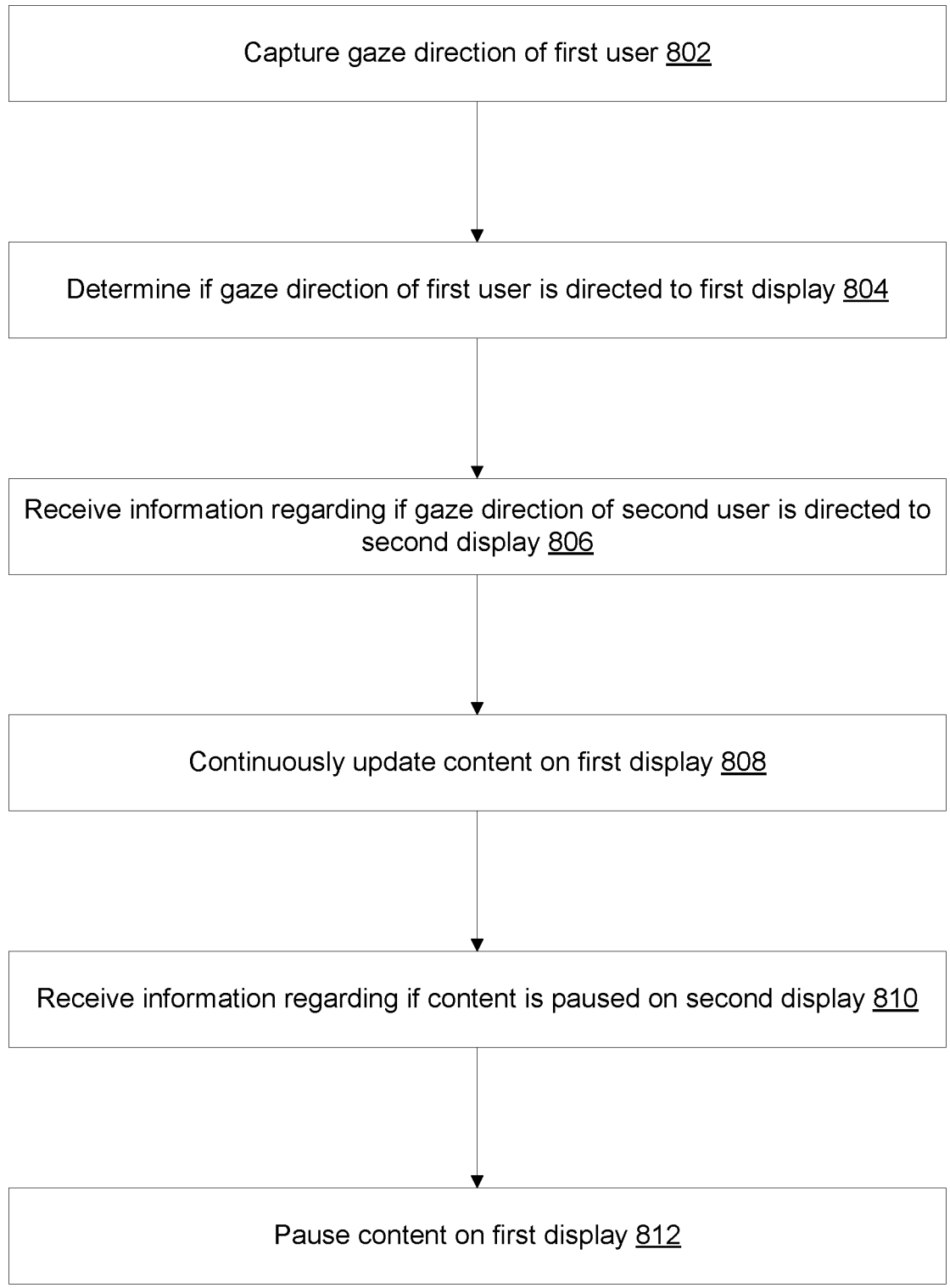
FIG. 8 illustrates a flow implemented by a first computing device to manage the presentation of content based on gaze information, according an embodiment of the present disclosure.
Figure 9:
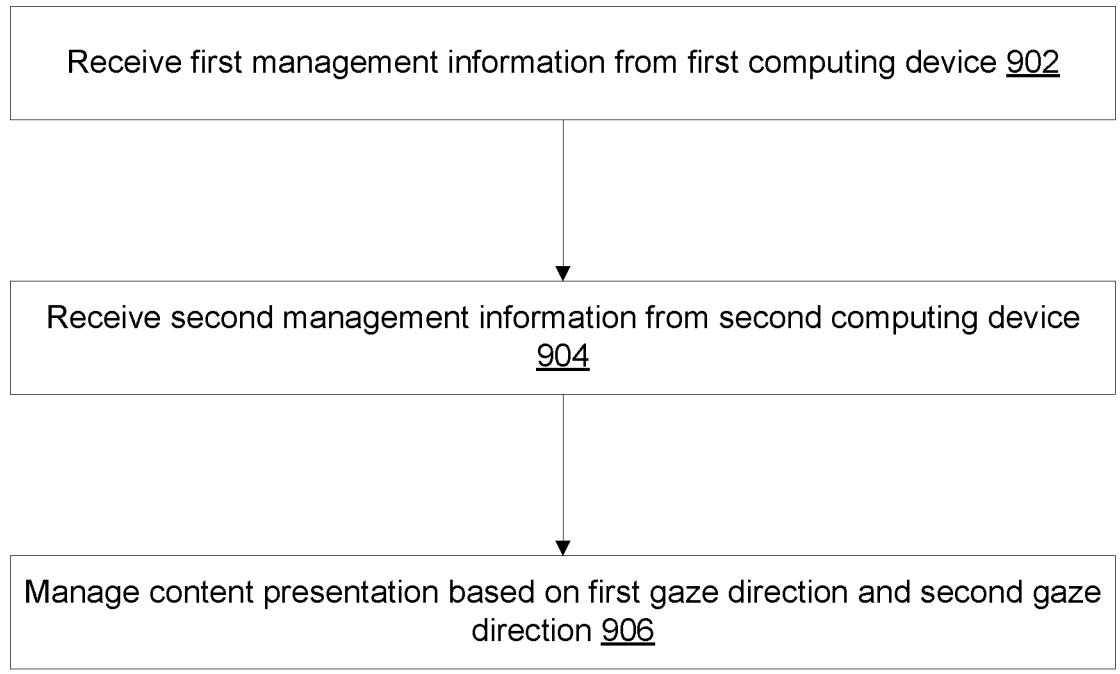
FIG. 9 illustrates a flow for managing to manage the presentation of content based on gaze information, according an embodiment of the present disclosure.

FIGS. 7-9 illustrate example embodiments for viewing content simultaneously on remote devices. In an example, users operates computing device to view instances of the same content. Gaze information of the users can be used to manage the presentation of the content including, for example, the synchronization of the content such that the same piece of content is presented simultaneously at the displays of the computing devices.

FIG. 7 illustrates a computer system for managing the presentation of content based on gaze information, according an embodiment of the present disclosure. As illustrated, the computer system includes a first computing device 720 of a first user 710 and a second computing device 770 of a second user 760. The first computing device 720 and the second computing device 770 are communicatively coupled over a data network (not shown in FIG. 7), such as the Internet or a local area network, to exchange data usable for managing the presentation of content. Each of the computing devices 720 and 770 presents content to the corresponding user. The content is the same at both computing devices 720 and 770 and is synchronized based on the gaze information such that the same piece of the content is presented simultaneously by both computing devices 720 and 770.

Optionally, the computer system further includes a synchronization server 750 that manages certain aspects of the content presentation at the computing devices 720 and 770. The use of the synchronization server 750 is further described herein below and operations thereof are further illustrated in FIG. 9.

In an example, the first user 710 operates the first computing device 720 to share content 730, such as video, a shared virtual space, audio, video game graphics, text, multimedia pages, a collaborative drawing, or the like, with the second user 760, where the shared content t is also presented on the second computing device 770. The content presented by the second computing device is shown as content 730' in FIG. 7 to illustrate that the content 730 presented by the first computing device and the content 730' presented by the second computing device are the same and are synchronized (e.g., are instances of the same content and the presentation at each of the computing devices is for the same piece of the content). Both computing devices 720 and 720 are equipped with an eye tracker, and thus are capable of tracking a user's gaze relative to their respective displays.

For instance, the first computing device 720 includes a number of computing components, such as a processor, a memory, a display (shown as a display 726 in FIG. 7), input/output (I/O) interfaces, network interfaces, and other computing components for receiving input of the first user 710 and communicating with the second computing device 770. For instance, the first computing device 720 can be a mobile device, tablet, a laptop, a desktop computer, a wearable device (e.g., a virtual reality device, an augmented reality device; in such a case, the display 726 is a head-mounted display) or any other suitable user device. In addition, the first computing device 720 includes (e.g., integrates or interfaces with) an eye tracking device 722 having similar components as the eye tacking system 100 of FIG. 1. The eye tracking device 722 is used to track a gaze 724 of the first user 710 on the display 726 and accordingly generate gaze information. The gaze information includes, among other data, a gaze direction of the gaze 724.

In an example, the first computing device 720 executes a content application that facilitates the presentation of the content 730 on the display 726 and the synchronization of the content's 730 presentation with the presentation of the same content 730' (e.g., the shared content) by the second computing device 770.

The content application may also interface with the eye tracking device 722 (or an eye tracking application executed by the eye tracking device 722) based on an application programming interface (API). Accordingly, the content application can receive certain gaze information from the eye tracking device 722 including, for instance, the gaze direction and/or location relative to the display 726 (the gaze location is shown as location 722 on the display 726 in FIG. 7).

Based on the gaze direction and/or the gaze location 722, the content application of the first computing device 720 determines whether the gaze direction of the first user 710 is directed to the display 726 and/or falls within the display (or within a GUI that presents the content 730).

The second computing device 770 may include similar computing components such as a display, an eye tracking device, and a content application. Accordingly, this content application of the second computing device 770 receives gaze information about a gaze 772 of the second user 760, including the second user's 760 gaze direction and/or gaze location 774 relative to the display 770. Based on the gaze direction and/or the gaze location 774 of the second user 760, the content application of the second computing device 770 determines whether the gaze direction of the second user 760 is directed to the display and/or falls within the display of the second computing device (or within a GUI that presents the content 730'). The gaze directions of the users 710 and 720 relative to the respective displays need not be the same for synchronizing the content presentation. Likewise, the gaze locations 722 and 774 of the users 710 and 720 on the respective displays need not be the same for synchronizing the content presentation.

In an example, the two computing devices 720 and 770 synchronize their content presentations such that both users 710 and 760 are viewing the same piece of content, based on their gaze activities relative to the displays. To do so, upon determining whether the first user's 710 gaze direction is directed to the display 726, the first computing device 720 sends an indication of this determination to the second computing device 770 over the data network (e.g., such as a flag set to "1" to indicate that the gaze direction is directed to the display 726 and, otherwise, set to "0"). Similarly, upon determining whether the second user's 720 gaze direction is directed to the display of the second computing device 770, the second computing device 770 sends an indication of this determination to the first computing device 720 over the data network (e.g., such as a flag set to "1" to indicate that the gaze direction is directed to the display of the second computing device 770 and, otherwise, set to "0").

The content presentation is synchronized by using the gaze indications. For example, the first computing device 720 continuously updates the content 730 (e.g., keeps playing the video) upon a determination by the first computing device 720 that the first user's 710 gaze direction is directed to the display and the gaze indication received from the second computing device 770 indicates that the second user's 760 gaze direction is directed to the display of the second computing device 770. Likewise, the second computing device 770 continuously updates the content 730' (e.g., keeps playing the video) upon a determination by the second computing device 770 that the second user's 760 gaze direction is directed to the display of the second computing device 770 and the gaze indication received from the first computing device 720 indicates that the first user's 710 gaze direction is directed to the display 726. If either of the conditions are not met (e.g., one of the users 710 and 770 is not gazing towards the corresponding display), the content presentation is simultaneously paused at both computing devices 720 and 770.

Accordingly, if the first user 710 gazes away from the display 726 (e.g., their gaze direction is no longer directed to the display 726), the first computing device 720 pauses the presentation of the content 730' and sends an indication of the change to the gaze direction to the second computing device 770 over the data network (e.g., updates the flag to "0" and sends the update). Upon receiving this update, the second computing device 770 also pauses the presentation of the content 730'. Assuming that the gaze direction of the second user 760 has not changed and is still directed to the display of the second computing device 770, upon a return of the first user's 710 gaze towards the display 726, the first computing device 720 un-pauses (e.g., resumes) the presentation of the content 730 and sends another update about the gaze direction (e.g., resets the flag to "1") to the second computing device 770. Accordingly, the second computing device 770 also un-pauses the presentation of the content 730'. The reverse scenario is likewise possible, where the second computing device sends updates 770 to the first computing device 720 based on changes to the second user's 760 gaze relative to the display of the second computing device 770.

As also illustrated in FIG. 7, the synchronization server 750 may be used to manage certain aspects of the content synchronization between the first user device 720 and the second user device 770. In particular, the synchronization server 750 can receive management information 752 from the computing devices 720 and 770 and, in response, transmit synchronization information 754 to the computing devices 720 and 770. Generally, the management information 752 is used to control the piece of content that should be presented at the computing devices 720 and 770 and the timing of the presentation.

In an example, the management information received from the first computing device 720 includes the determination of whether the first user's 710 gaze direction (or, similarly, gaze location) is directed to the display 726. Likewise, the management information received from the second computing device 770 may include the corresponding determination. Based on both determinations, the synchronization server 750 may send the synchronization information 754 to the two computing devices 720 and 770. For example, if both determinations indicate that the two users 710 and 760 are gazing towards their corresponding displays, the synchronization information 754 includes instructions to present the content 730 by the first computing device 710 and the content 730' by the second computing device 770 at the same time. Otherwise, the synchronization information 754 includes instructions to pause the presentation of the content 730 by the first computing device 710 and the presentation of the content 730' by the second computing device 770 at the same time.

FIG. 8 illustrates a flow implemented by a first computing device to manage the presentation of content based on gaze information, according an embodiment of the present disclosure. A first computing device, such as the first computing device 720 of FIG. 7, is described as performing operations of the flow. Instructions for performing the operations can be stored as computer-readable instructions on a non-transitory computer-readable medium of this computing device. As stored, the instructions represent programmable modules that include code or data executable by a processor(s) of the computing device. The execution of such instructions configures the computing device to perform the specific operations shown in FIG. 8 and described herein. Each programmable module in combination with the processor represents a means for performing a respective operation(s). While the operations are illustrated in a particular order, it should be understood that no particular order is necessary and that one or more operations may be omitted, skipped, and/or reordered. Further, for the purpose of brevity, the use of gaze directions is described in connection with the example flow of FIG. 8. Nonetheless, the example flow can be similarly performed by additionally or alternatively using gaze location on a display.

As illustrated, the example flow of FIG. 8 starts at operation 802, where the first computing device captures a gaze direction of a first user of the first computing device. In an example, the gaze direction is captured by using an eye tracking device. In particular, the eye tracking device generates gaze information about the gaze of the first user on a first display of the first computing device. The gaze information includes the gaze direction.

At operation 804, the first computing device determines if the gaze direction of the first user is directed to the first display. In an example, the first computing device compares the gaze direction (e.g., in three dimensional space) to a location of the display (e.g., in the three dimensional space) to perform this determination. Upon a positive determination, the first computing device may set a flag to "1," thereby indicating that the gaze direction of the first user is directed to the first display. Otherwise, the flag may be set to "0."

At operation 806, the first computing device receives information regarding if the gaze direction of a second user is directed to a second display. In an example, this information is received over a data network from a second computing device that includes the second display. The received information can include a flag set to "1" to indicate that the gaze direction of the second user is directed to the second display and, otherwise, set to "0."

At operation 808, the first computing device continuously updates content on the first display, if the gaze direction of the first user is directed to the first display and the gaze direction of the second user is directed to the second display. In an example, the continuous updates include involve presenting pieces of the same content are simultaneously on the two displays.

At operation 810, the first computing device receives, from the second computing device, information regarding if the content is paused on the second display. In an example, the second computing device sends this information based on a number of factors. One factor may include input of the second user at an input of the second computing device (e.g., a mouse click) pausing the content. Another factor may be a change to the gaze direction of the second user. For instance, if the second user gazes away from the second display, the second computing device may pause the presentation of the content on the second display and may send an indication of the gaze change (or, similarly, the pausing) in a flag update to the first computing device.

At operation 812, the first computing device pauses the content on the first display. Various factors can be used for this pausing. In one example, the content on the first display is paused if the gaze direction of the second user is not directed to the second display. In another example, the content on the first display is paused if the content is paused on the second display. In yet another example, the content on the first display is paused if the gaze direction of the first user is not directed to the first display.

FIG. 9 illustrates a flow for managing to manage the presentation of content based on gaze information, according an embodiment of the present disclosure. A synchronization server, such as the synchronization server 750 of FIG. 7, is described as performing operations of the flow. Instructions for performing the operations can be stored as computer-readable instructions on a non-transitory computer-readable medium of this synchronization server. As stored, the instructions represent programmable modules that include code or data executable by a processor(s) of the synchronization server The execution of such instructions configures the synchronization server to perform the specific operations shown in FIG. 9 and described herein. Each programmable module in combination with the processor represents a means for performing a respective operation(s). While the operations are illustrated in a particular order, it should be understood that no particular order is necessary and that one or more operations may be omitted, skipped, and/or reordered. Further, for the purpose of brevity, the use of gaze directions is described in connection with the example flow of FIG. 9. Nonetheless, the example flow can be similarly performed by additionally or alternatively using gaze location.

As illustrated, the example flow of FIG. 9 starts at operation 902, where the synchronization server receives first management information from a first computing device. In an example, the first management information includes information about a determination performed by the first computing device of whether a first gaze direction of a first user of the first computing device is directed to a first display of the first computing device.

At operation 904, the synchronization server receives second management information from a second computing device that is communicatively coupled with the first computing device. This operation is similar to operation 902, except that this management information is generated and sent by the second computing device. In particular, the second management information is generated based on a second gaze direction of a second user of the second computing device and indicates whether the second user's gaze direction is directed to a second display of the second computing device.

At operation 906, the synchronization server manages the presentation of content on the first computing device and the second computing device based on the first gaze direction and second gaze direction. If both gaze directions indicate that the two users are gazing towards their corresponding displays, synchronization server sends synchronization information to the two computing devices, where this information includes instructions to present the same pieces of the content by the first computing device and the second computing device at the same time. Otherwise, the synchronization information includes instructions to pause the presentation of the content by each of the computing devices at the same time.

What is claimed is:

1. A method of interaction, performed by a first computing device, comprising:
using an eye tracking device, capturing a gaze direction of a first user of the first computing device;
determining the gaze direction of the first user is directed to a first display, by comparing the gaze direction to a location of the display;
receiving information regarding a gaze direction of a second user directing to a second display;
continuously updating content on the first display, based on determination of the gaze direction of the first user is directed to the first display and the gaze direction of the second user is directed to the second display; and
pausing the content on the first display, the gaze direction of the second user is not directed to the second display.

2. The method according to claim 1, further comprising:
receiving information regarding the content is paused on the second display; and
pausing the content on the first display, based on determination of the content is paused on the second display.

3. The method according to claim 1, further comprising
pausing the content on the first display, based on determination of the gaze direction of the first user is not directed to the first display.

4. The method according to claim 1, wherein the content comprises a video file.

5. The method according to claim 1, wherein the content represents a virtual space.

6. The method according to claim 1, wherein the content comprises an audio file.

7. The method according to claim 1, wherein the content comprises video game graphics.

8. The method according to claim 1, wherein the content comprises a multimedia page.

9. A first computing device, comprising:
an eye tracking device configured to capture a gaze direction of a first user; and
a first display;
wherein the first computing device further is configured to:
determining the gaze direction of the first user is directed to a first display, by comparing the gaze direction to a location of the display;
receive information regarding a gaze direction of a second user directing to a second display;
continuously update content on the first display, based on determination of the gaze direction of the first user is directed to the first display and the gaze direction of the second user is directed to the second display; and
pause the content on the first display, based on determination of the gaze direction of the second user is not directed to the second display.

10. The first computing device according to claim 9, further being configured to:
receive information regarding the content is paused on the second display; and
pause the content on the first display, based on determination of the content is paused on the second display.

11. The first computing device according to claim 9, further being configured:

pause the content on the first display, based on determination of the gaze direction of the first user is not directed to the first display.

12. The first computing device according to claim 9, wherein the content comprises a video file.

13. The first computing device according to claim 9, wherein the content represents a virtual space.

14. The first computing device according to claim 9, wherein the content comprises an audio file.

15. The first computing device according to claim 9, wherein the content comprises video game graphics.

16. The first computing device according to claim 9, wherein the content comprises a multimedia page.

17. The first computing device according to claim 9, wherein the first display is a head-mounted display.

18. A non-transitory computer-readable storage medium storing instructions that, upon execution on a first computing device, configure the first computing device to perform operations comprising:
- using an eye tracking device, capturing a gaze direction of a first user of the first computing device;
- determining the gaze direction of the first user is directed to a first display, by comparing the gaze direction to a location of the display;
- receiving information regarding a gaze direction of a second user directing to a second display;
- continuously updating content on the first display, based on determination of the gaze direction of the first user is directed to the first display and the gaze direction of the second user is directed to the second display; and
- pausing the content on the first display, based on determination of the gaze direction of the second user is not directed to the second display.

* * * * *